US011496323B1

(12) United States Patent
Caceres et al.

(10) Patent No.: US 11,496,323 B1
(45) Date of Patent: *Nov. 8, 2022

(54) SYSTEMS AND METHODS FOR CONTAINER ORCHESTRATION SECURITY

(71) Applicant: CITIGROUP TECHNOLOGY, INC., Weehawken, NJ (US)

(72) Inventors: Javier Caceres, Dublin (IE); Robert Dailey, Richboro, PA (US); Bartlomiej Dolata, Warsaw (PL); Carlos Lopes, London (GB); Damodhar Neelagiri, East Windsor, NJ (US); Ramkumar Pandurangan, Kendall Park, NJ (US); Alexandra Shulman-Peleg, Givatayim (IL)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 683 days.

This patent is subject to a terminal disclaimer.

(21) Appl. No.: 16/516,761

(22) Filed: Jul. 19, 2019

Related U.S. Application Data

(63) Continuation of application No. 15/423,047, filed on Feb. 2, 2017, now Pat. No. 10,404,474.

(51) Int. Cl.
*H04L 29/06* (2006.01)
*H04L 9/32* (2006.01)
(Continued)

(52) U.S. Cl.
CPC .............. *H04L 9/3263* (2013.01); *G06F 8/65* (2013.01); *H04L 9/006* (2013.01); *H04L 9/30* (2013.01)

(58) Field of Classification Search
CPC ......... H04L 9/3263; H04L 9/006; H04L 9/30; G06F 8/65
(Continued)

(56) References Cited

U.S. PATENT DOCUMENTS

2016/0212012 A1* 7/2016 Young .................... G06F 9/00
2018/0309747 A1* 10/2018 Sweet ................ G06F 9/45558

OTHER PUBLICATIONS

Cloud Security Alliance, Cloud Controls Matrix Working Group, https://cloudsecurityalliance.org/group/cloud-controls-matrix/, 12.
(Continued)

*Primary Examiner* — Evans Desrosiers
(74) *Attorney, Agent, or Firm* — Johnson, Marcou, Isaacs & Nix, LLC; George Marcou; Scott A. Hendrix (57) ABSTRACT

Systems and methods for container orchestration security employ one or more processors that separate a lifecycle of one or more containers into a plurality of predefined container image lifecycle phases; segregates control of the plurality of predefined container image lifecycle phases into a plurality of control environments separately controlled by different enterprise control components isolated from one another. In addition, one or more external processors may generate one or more certificates that are based on the platform, state attributes and meta data for interaction of the container with one or more external nodes. The one or more processors may also control the promotion, update and deletion of container images between the plurality of lifecycle phases and registries in different control environments as well as between the enterprise registries and the plurality of other registries that are part of multiple external clouds.

27 Claims, 8 Drawing Sheets

(51) Int. Cl.
*H04L 9/30* (2006.01)
*H04L 9/00* (2022.01)
*G06F 8/65* (2018.01)

(58) Field of Classification Search
USPC .......................................................... 713/156
See application file for complete search history.

(56) References Cited

OTHER PUBLICATIONS

Office Action for U.S. Appl. No. 15/423,047, dated Nov. 9, 2018, 21.

NCC Group Whitepaper, Understanding and Hardening Linux Containers, https://www.nccgroup.trust/globalassets/our-research/us/whitepapers/2016/april/ncc_group_understanding_hardening_linux_containers-10pdf/, Apr. 20, 2016, 122.

"Securing the Enterprise Software Supply Chain Using Docker, Docker Security Team", https//blog.docker.com/2016/08/securing-enterprise-software-supply-chain-using-docker/, Aug. 23, 2016.

Barlev, et al., "Secure, Yet Usable—Protecting Servers and Linux Containers", IBM Journal of Research and Development, vol. 60, No. 4, Jul. 27, 2016, 12.

Mattetti, et al., "Securing the Infrastructure and the Workloads of Linux Containers", Communications and Network Security (CNS), 2015 IEEE Conference, 2015, 559-567.

McCauley, "Your Software is Safer in Docker Containers", https://blog.docker.com/2016/08/software-security-docker-containers/, Aug. 23, 2016, 5.

Merkel, "Docker: Lightweight Linux Containers for Consistent Development and Deployment", Linux Journal,, May 19, 2014, 3.

\* cited by examiner

SYSTEMS AND METHODS FOR CONTAINER ORCHESTRATION SECURITY

CROSS REFERENCE TO RELATED APPLICATIONS

This application claims priority to and is a continuation of co-pending U.S. patent application Ser. No. 15/423,047 filed Feb. 2, 2017, entitled "Systems and Methods for Container Orchestration Security", the entire contents of which are hereby expressly incorporated herein by this reference including, without limitation, the specification, claims, and abstract, as well as any figures, tables, or drawings thereof.

FIELD OF THE INVENTION

The present invention relates generally to the field of cloud computing, and more particularly to methods and systems for enterprise security in container orchestration environments.

BACKGROUND OF THE INVENTION

Currently, cloud computing provides shared computer processing resources and data to computers and other devices on demand. In addition, DevOps (a clipped combination of development and operations) emphasizes collaboration and communication of software developers and other information technology (IT) professionals while automating the process of software delivery and infrastructure changes.

Further, cloud and DevOps technologies may allow increased productivity and reduction of software time-to-market and costs. For example, DevOps may automate the process of software delivery, allowing fast deployment of changes from development to operations, which may result in increased speed and reliability when building, testing, and releasing software. Microservices is an architectural style in which applications comprise small, independent modules communicating via well-defined interfaces. These modules may be easily updated, modified or replaced without influencing the stability of the entire application.

LINUX™ containers is an example of an operating-system-level virtualization model which groups resources such as processes, files, and devices into isolated spaces. Container management and orchestration solutions, such as DOCKER™, are employed to create the containers and to control their lifecycle. For example, DOCKER™ may allow saving the state of containers to images that contain everything necessary for their execution including code, runtime, system tools, and system libraries. These images may be stored and instantiated to running containers wherever required. Thus, there is a well-defined lifecycle phases of containers defined by container management solutions, such as DOCKER™, which include their creation (build), distribution (pull) and deployment (run) stages. These may be executed, for example, on LINUX™ or WINDOWS™ hosts or any other suitable host operating system. As used below, the term "image" refers to such images. Finally, cloud computing service platform solutions (also referred to as Platform as a Service or PaaS cloud computing solutions), such as OPENSHIFT™ and CLOUDFOUNDRY™, may provide automatic orchestration of containerized services across large clusters of servers.

It is to be understood that references herein to LINUX™ are examples only and that embodiments of the invention are not limited to any particular operating-system-level virtualization model but may include or employ any other suitable OS-level virtualization model or models. It is to be further understood that references herein to DOCKER™ are likewise examples only and that embodiments of the invention are not limited to any particular container management and orchestration software but may include or employ any other suitable container management and orchestration solution or solutions. In addition, it is to be understood that references herein to OPENSHIFT™ and CLOUDFOUNDRY™ are also examples only and that embodiments of the invention are not limited to any particular cloud computing service platform but may include or employ any other suitable cloud computing service platform.

Significant bottlenecks in the adoption of these technologies by large enterprises include, for example, new security threats, integration with existing enterprise architectures, especially in the areas of infrastructure orchestration, application lifecycle management, and fulfilling external security requirements. Existing security solutions are insufficient to fulfill all of the security requirements of such large enterprises Although cloud computing service platform providers have made initial efforts to strengthen the security of their solutions, such efforts fail to fulfill all of such security requirements and cannot be easily integrated with existing enterprise system.

There is a present need for technological solutions that address the problems of these legacy mechanisms and enable a mechanism that eliminates the deficiencies associated with these currently employed mechanisms. The problem to be solved is rooted in technological limitations of such legacy approaches. Improved techniques and, in particular, improved applications of technology are needed to address the problems of these current mechanisms. More specifically, the technologies applied in the aforementioned legacy approaches fail to achieve the sought-after capabilities of the herein-disclosed techniques for integrating such legacy approaches with existing enterprise architectures while preventing security threats.

SUMMARY OF THE INVENTION

Embodiments of the invention advance the technical fields for addressing problems associated with the above described currently employed mechanisms for enterprise security in container orchestration environments. Such embodiments are directed to technological solutions that may involve systems that include, for example, a server or a group of servers having one or more processors potentially distributed and/or isolated from each other and being programmed to separate a lifecycle of at least one container into a plurality of predefined container image lifecycle phases; segregate control of said plurality of predefined container image lifecycle phases into a plurality of control environments separately controlled by different enterprise control components isolated from one another. The one or more processors may be further programmed to generate at least one certificate for interaction of said at least one container with at least one cloud computing platform node.

In embodiments of the invention, the one or more processors may be further programmed, for example, to separate the lifecycle of said at least one container into a plurality of predefined container image lifecycle phases comprising an image distribution phase, a deployment phase, a container execution control phase, and a monitoring and protection phase. In further embodiments, the one or more processors may be further programmed, for example, to segregate control of said plurality of predefined container image lifecycle phases into the plurality of control environments comprising an image development environment, an image testing environment, and a container production environment separately controlled by different enterprise control components isolated from one another. In still further embodiments, the one or more processors may be further programmed, for example, to control promotion of container images between the plurality of control environments comprising an image development environment, an image testing environment, and a container production environment.

In additional embodiments, the one or more processors may be further programmed, for example, to couple a cloud computing service platform policy engine function with a secondary approval function of the enterprise server. The one or more processors may be further programmed, for example, to intercept and forward cloud computing service platform operations requests for authorization by the cloud computing service platform policy engine to the enterprise secondary approval function of the enterprise server. The one or more processors may also be programmed, for example, to intercept and forward the cloud computing service platform operations requests for authorization according to predefined platform policies by the cloud computing service platform policy engine to the enterprise secondary approval function of the enterprise server. In additional embodiments, the policy engine may comprise an authentication module, and the enterprise secondary approval function may comprise an enterprise multifactor authentication system.

In other embodiments, the one or more processors may be further programmed, for example, to return the cloud computing service platform operations requests to the cloud computing service platform policy engine after secondary approval by the enterprise secondary approval function of the enterprise server. In further embodiments, the one or more processors may be further programmed, for example, to return the cloud computing service platform operations requests to the cloud computing service platform policy engine after secondary approval by the enterprise secondary approval function of the enterprise server according to predefined internal policies of the enterprise independent of the predefined platform policies.

In still other embodiments of the invention, the one or more processors may be further programmed, for example, to couple cloud computing service platform context attributes and metadata with an enterprise certificate generation function of the enterprise server. In additional embodiments, the one or more processors may be further programmed, for example, to intercept and pass cloud computing service platform resource provisioning requests to the enterprise certificate generation function of the enterprise server. In other embodiments, the one or more processors may be further programmed, for example, to extract cloud computing service platform context attributes and metadata from the cloud computing service platform resource provisioning requests. The extracted attributes may then be inserted into certificate fields to better restrict the communication between the nodes In further embodiments of the invention, the one or more processors may be further programmed, for example, to pass the cloud computing service platform resource provisioning requests with the extracted cloud computing service platform context attributes and metadata to an enterprise certificate generation function of the enterprise server. In additional embodiments, the one or more processors may be further programmed, for example, to generate the at least one certificate based at least in part on the extracted cloud computing service platform context attributes and metadata by the enterprise certificate generation function of the enterprise server.

In other embodiments of the invention, the one or more processors may be programmed, for example, to push at least one container update to at least one cloud computing service platform internal registry. In still other embodiments, the one or more processors may be programmed, for example, to push said at least one container update from the enterprise registry to a plurality of cloud computing service platform internal registries in a one-to-many relationship.

Embodiments of the invention employ computer hardware and software, including, without limitation, one or more processors coupled to memory and non-transitory computer-readable storage media with one or more executable programs stored thereon which instruct the one or more processors to perform methods involving, for example, separating a lifecycle of at least one container into a plurality of predefined container image lifecycle phases; segregating control of said plurality of predefined container image lifecycle phases into a plurality of control environments separately controlled by different enterprise control components isolated from one another. Other embodiments may involve, for example, generating at least one certificate for interaction of said at least one container with at least one external node.

In embodiments of the invention, separating the lifecycle of the at least one container into the plurality of predefined container lifecycle phases may involve, for example, separating the lifecycle of said at least one container into a plurality of predefined container image lifecycle phases consisting at least in part of an image distribution phase, a deployment phase, a container execution control phase, and a monitoring and protection phase. In other embodiments, segregating control of said plurality of predefined container lifecycle phases into a plurality of control environments may involve, for example, segregating control of said plurality of predefined container lifecycle phases into a plurality of control environments consisting at least in part of an image development environment, an image testing environment, and a container production environment separately controlled by different enterprise control components isolated from one another.

Additional embodiments of the invention may involve, for example, coupling a cloud computing service platform policy engine function with a secondary approval function of the enterprise server. Further embodiments may involve, for example, coupling cloud computing service platform context attributes and metadata with an enterprise certificate generation function of the enterprise server. Other embodiments may involve, for example, pushing container image updates to one or more cloud computing service platform internal registries. Still other embodiments may involve, for example, employing the one or more cloud computing service platform internal registries as an image content delivery network distributing enterprise updates and container images to remote locations. Still further embodiments may involve, for example, removing vulnerable, outdated, non-compliant or unused images from the plurality of internal computing registries container images based on feedback from internal or external security monitoring systems, and triggering enterprise image re-build and re-deploy procedures.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention may involve, for example, assuring that enterprises dealing with sensitive data integrate cloud computing services platforms with additional control systems in which access control may be air gapped and segregation of duties and multifactor authentication may ensure that the cloud cannot be compromised by a single operation of an attacker. In addition, embodiments of the invention may involve, for example, assuring that communication between each pair of nodes should be authenticated and encrypted using public key infrastructure (PKI), management of digital certificates generation, distribution and storage, as well as public-key encryption.

Enterprise cloud computing services platform may require protecting various types of communication, such as inter-cluster communication involving, for example, certificate management for the security of communication between the internal platform components, such as between nodes and API servers; intra-cluster communication involving, for example, certificate management for communication between the clusters, such as DEV/UAT and PROD); and communication with external nodes and clients connected over the internet.

As noted, while legacy mechanisms have attempted to address the communication with external nodes and clients connected over the internet, existing security solutions are insufficient to fulfill all of the security requirements. Technological solutions provided by embodiments of the invention address inter-cluster communication and intra-cluster communication, for example, with novel certificate generation approaches integrating cloud computing platforms with enterprise systems in a way which supports the scalability and the dynamic nature of the cloud platform while complying with enterprise requirements regarding certificate authorities as well as fields and details of certificates.

Embodiments of the invention provide, for example, a security architecture for container orchestration environments that may employ operating system level virtualization methods, such as LINUX™ containers and DOCKER™ software, and cloud computing services, such as cloud computing service platform solutions, that may be abstracted to satisfy enterprise policies and controls. In embodiments of the invention, the lifecycle of containers, such as LINUX™ containers, may be split, and each stage of the lifecycle may be controlled by a different enterprise system. Such embodiments may provide mechanisms, such as separating and controlling container lifecycle, air gapping and segregation of duties, coupling an external certificate management system with cloud computing service platform flows and attributes, and controlling multi-cloud image registries.

Separating and controlling container lifecycle for embodiments of the invention may involve, for example, splitting the container lifecycle into phases and environments, air gapping, and/or providing physical isolation. In particular, lifecycle splitting may involve, for example, separating the container image lifecycle into stages such as image distribution and deployment, as well as container execution control, monitoring and protection, such that each phase may be controlled by a different component in the enterprise architecture. For example, image provisioning may be performed via external cloud/container orchestration tools, and image instantiation may be provided via separately controlled application deployment tools. Further, in an environments segmentation aspect for embodiments of the invention, development/user acceptance testing (DEV/UAT) and production (PROD) environments may be isolated from one another, and the transition of images between DEV/UAT and PROD may be managed by dedicated container/cloud orchestration components maintaining the required state and metadata.

Figure 1:
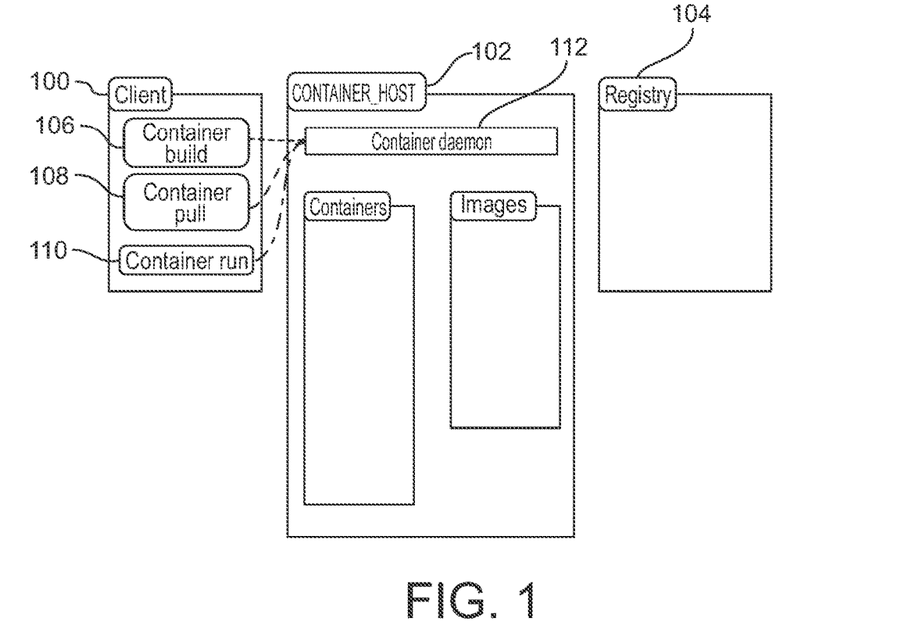
FIG. 1 is a schematic diagram that illustrates an example of components and the flow of information between components of a container management and orchestration solution.
Figure 2:
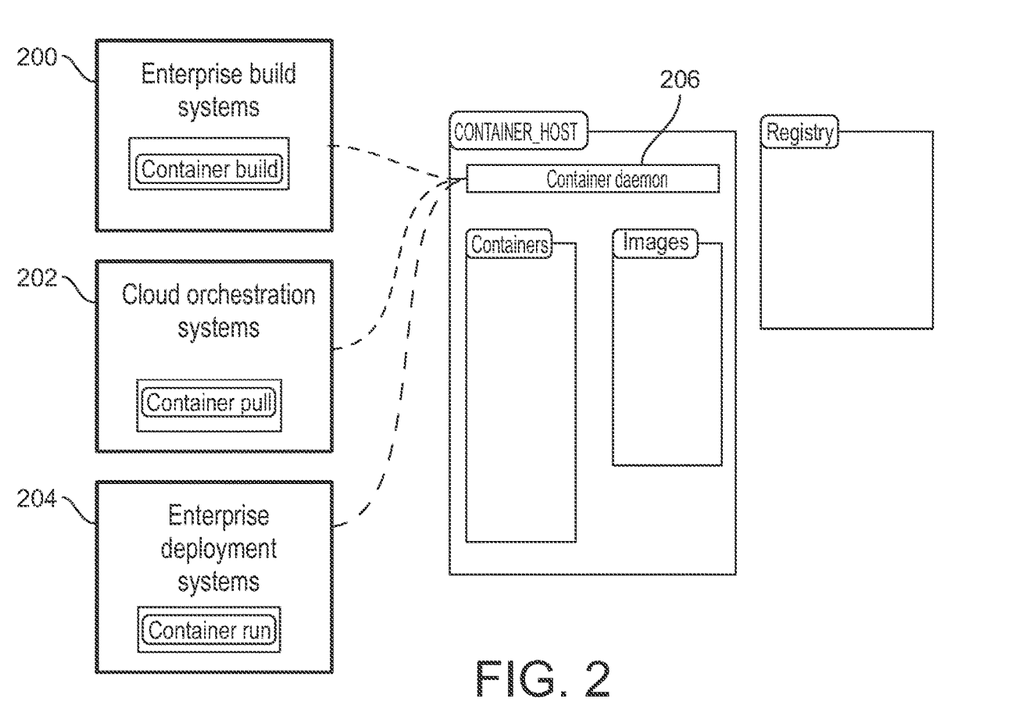
FIG. 2 is a schematic diagram that illustrates an example of components and the flow of information between components in a container lifecycle separation and control aspect of a container management and orchestration solution for embodiments of the invention.

FIG. 1 is a schematic diagram that illustrates an example of components and the flow of information between components of an open source container management and orchestration solution. Referring to FIG. 1, a current container management and orchestration solution system, such as a current open source DOCKER™ project, may include, for example, a client 100, a host 102, and a registry 104. FIG. 2 is a schematic diagram that illustrates an example of components and the flow of information between components in a container lifecycle separation and control aspect of a container management and orchestration solution for embodiments of the invention. Referring to FIG. 2, embodiments of the invention may employ novel components that do not exist in current solutions, such as enterprise build systems 200, cloud orchestration systems 202, and enterprise deployment systems 204.

For example, referring further to FIG. 1, in a current open source DOCKER™ project, a build is performed by simply running a command "container build" 106 on the host. However, referring to FIG. 2, in embodiments of the invention, build may be performed by dedicated enterprise build systems 200, which do nothing but perform build. For another example, as shown in FIG. 2, cloud orchestration system 202 for embodiments of the invention may pull images from a platform internal registry to the host and perform no other function. For an additional example, as also shown in FIG. 2, enterprise deployment systems 204 may run containers but do not build, pull or perform any other phase in the container lifecycle.

Referring again to FIG. 2, lifecycle splitting for embodiments of the invention may involve, for example separating the container lifecycle, so that each phase is controlled by a different enterprise component. Further, in order to control the system for embodiments of the invention, security may be deployed on each of those components to ensure that each component may perform only the allowed operations. Thus, in embodiments of the invention, the enterprise build systems 200 may only perform builds, the cloud orchestration systems 202 may only pull and move images from one place to another, and the enterprise deployment systems 204 may only deploy applications and may not build or pull applications. In addition, in embodiments of the invention, a security alert system may generate security alerts when separation of these functions is violated. For example, when a legitimate application program interface (API) call is performed by a wrong entity, a security alert may be issued to a security operations center.

Figure 3:
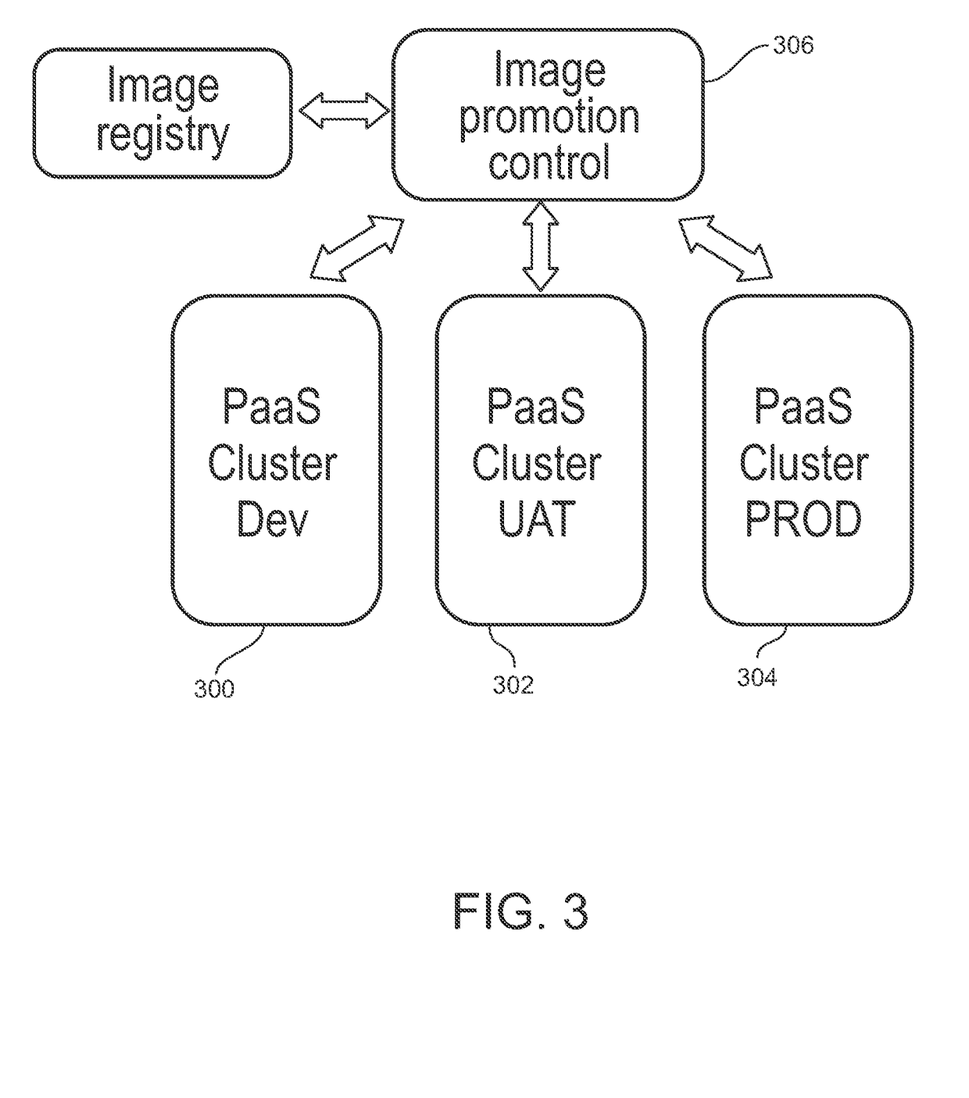
FIG. 3 is a schematic diagram showing an example of environment segmentation with a dedicated component promoting images between the environments for embodiments of the invention.

FIG. 3 is a schematic diagram showing an example of environment segmentation with a dedicated component promoting images between the environments for embodiments of the invention. Referring to FIG. 3, in embodiments of the invention, development or DEV environments 300, testing or UAT environments 302, and PROD or production environments 304 may be totally isolated from one another. Embodiments of the invention may also employ an image promotion control component 306 that may manage transition of images from one of such environments to another and may control and manage the required state and metadata. The image promotion control component 306 for embodiments of the invention may also provide additional attributes, credentials and certificates that may be needed in a specific environment.

In embodiments of the invention, the regular container lifecycle may be separated and controlled by different existing enterprise entities. For example, the container lifecycle may be separated into phases, such as image distribution, deployment, execution control, monitoring and protection. Further, each phase may be controlled by a different component in the enterprise architecture. As shown in FIG. 1, a current mode of interaction between build 106, pull 108, and run 110 DOCKER™ components and a DOCKER™ daemon 112 is over a single flow. As shown in FIG. 2, the enterprise build 200, cloud orchestration 202, and enterprise deployment 204 systems for embodiments of the invention are entirely separate structural components which may be implemented by different control products from different components. Thus, embodiments of the invention involve, for example, splitting the interactions between the build 200, cloud orchestration 202 and enterprise deployment 204 systems and the DOCKER™ daemon 206 into entirely separate flows.

In embodiments of the invention, image provisioning may be controlled via external cloud/container orchestration tools, and image instantiation may be separately controlled via application deployment tools. Further, each component may be controlled by a different team with different privileges, such as different organizations and administrators versus developers. When a legitimate API call is performed by the wrong entity, a security alert may be issued to a security operations center. For example, when an enterprise deploy system is misused to build a container and to pull a content of another container, the operation may be stopped and a security violation may be reported.

Currently, a cloud computing service platform solution may include a component referred to as a policy engine that makes authorization decisions for the platform. Thus, when a cloud computing service platform request, such as a request for application deployment, is received, the request goes to the policy engine, which may approve the request. However, embodiments of the invention do not rely on such cloud computing service platform policy engines because they are not secure, for example, against compromise of the system by an attacker. Thus, in an air gapping and segregation of duties aspect for embodiments of the invention, such requests may be intercepted and sent to an enterprise approval process for a secondary approval.

Air gapping and segregation of duties for embodiments of the invention may involve, for example, providing air-gapped access control and secondary approvals over cloud computing service platform operations and cluster management. Thus, embodiments of the invention may provide a mechanism for coupling, for example, via cloud computing service platform flows between container orchestration and enterprise secondary approval systems that intercept requests authorized by cloud computing service platform policies and forward them to additional secondary approval systems in a way that allows the cloud computing service platform flow to continue once the approval is obtained.

Figure 4:
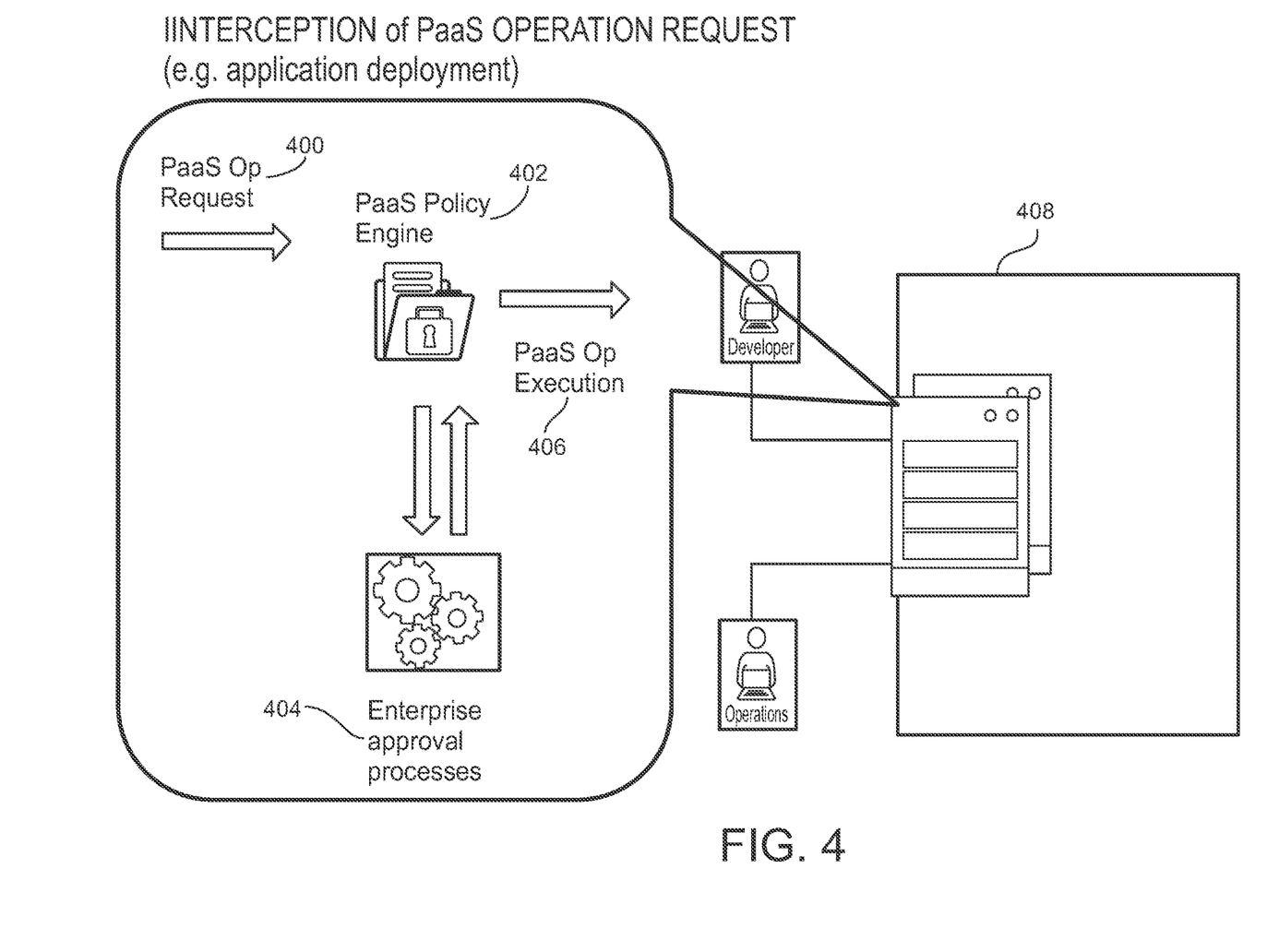
FIG. 4 is a schematic diagram that illustrates an example of components and flow of information between components for an air gapping and segregation of duties aspect for embodiments of the invention.

FIG. 4 is a schematic diagram that illustrates an example of components and flow of information between components for an air gapping and segregation of duties aspect for embodiments of the invention. Examples of issues that secondary approval for embodiments of the invention may address may include, for example, whether a particular person is allowed to start a process or access a segment of the infrastructure. Thus, referring to FIG. 4, in embodiments of the invention, any operations request 400 that may require additional approval may be intercepted and sent from the cloud computing service platform policy engine 402 to be addressed internally by an enterprise approval process 404. After internal approval by the enterprise approval process 404 for embodiments of the invention, the requests may be sent back to the policy engine 402 and may proceed to operations execution 406.

Referring further to FIG. 4, an operations request 400 may be, for example, a request for access to a database or a request to start a web server. In current cloud computing service platform systems, the policy engine 402 may examine the request 400 according to predefined rules of the platform 408 to determine whether or not the requestor is authorized to access the database or start the web server in the particular environment. However, such predefined rules may not include consideration of the internal management organization of the enterprise, such as an identification of a manager to approve the request. The enterprise approval process 404 for embodiments of the invention may intercept such requests to assure proper authorization according to internal management of the enterprise before returning the request to the policy engine 404.

It is to be understood that there are presently many platform solutions, such as platform 408, available from different suppliers and providers. Each such offering typically includes a policy engine that makes decisions based on policies defined in each different platform. However, none of those different predefined platform policies may define internal management rules of a particular enterprise, and when a new product arrives as a cloud computing service platform solution, an enterprise must map requirements of the enterprise approval process to the predefined policies of the platform. That onerous mapping process may be eliminated by deployment of an enterprise approval process for embodiments of the invention that intercepts operations requests that are submitted to the platform's policy engine and performs a secondary approval process according to internal management rules of the particular enterprise. Thus, instead of attempting to adjust the platform's policy engine to the enterprise's requirements, embodiments of the invention may deploy an enterprise approval system into the operations request data flow.

As shown in FIG. 4, embodiments of the invention may involve insertion of security tools for air gapping and administrator access control on a platform, such as an OPENSHIFT™ cloud computing service platform. The secondary approval processes may be added to existing cloud computing service platform controls and flows. As illustrated in FIG. 2, in embodiments of the invention, a dedicated architecture may be added to control the privileges and operations in the cloud computing service platform system combined with enterprise role management and secondary approval systems. In addition, a segregation of duties may be implemented over the cloud computing service platform policy engine. When a user or service account attempts an action and the policy engine checks for authorization, the flow may be intercepted and an additional secondary flow approval may be initiated according to enterprise requirements.

The secondary approval process for embodiments of the invention may serve, for example, to segregate all duties and assure that an attacker cannot inflict damage in a single operation. For example, the secondary approval process assures that an attacker may not simply erase a segment of an automated operation. Instead, in embodiments of the invention, operations requests may be intercepted and inspected before the request is allowed to proceed to execution.

Currently, in a cloud computing service platform system, certificates are typically generated, distributed and managed by the platform itself. However, in certain highly regulated industries, such as banking, it is not possible for enterprises to use such current model. Thus, it is necessary for such enterprises to develop their own certificate management solutions in which the enterprises generate their own certificates and distribute those certificates to various nodes.

In embodiments of the invention, in order for an enterprise to generate and distribute its own certificates to various nodes, the enterprise must know the cloud computing service platform context, including attributes and metadata. Such attributes and metadata may include, for example, system state and component attributes, such as execution environment (e.g., DEV/UAT), function, and image attributes. Thus, embodiments of the invention may involve, for example a correlation between enterprise certificate management and cloud computing service platform flow attributes that may reflect what is occurring in the cloud computing service platform system.

Figure 5:
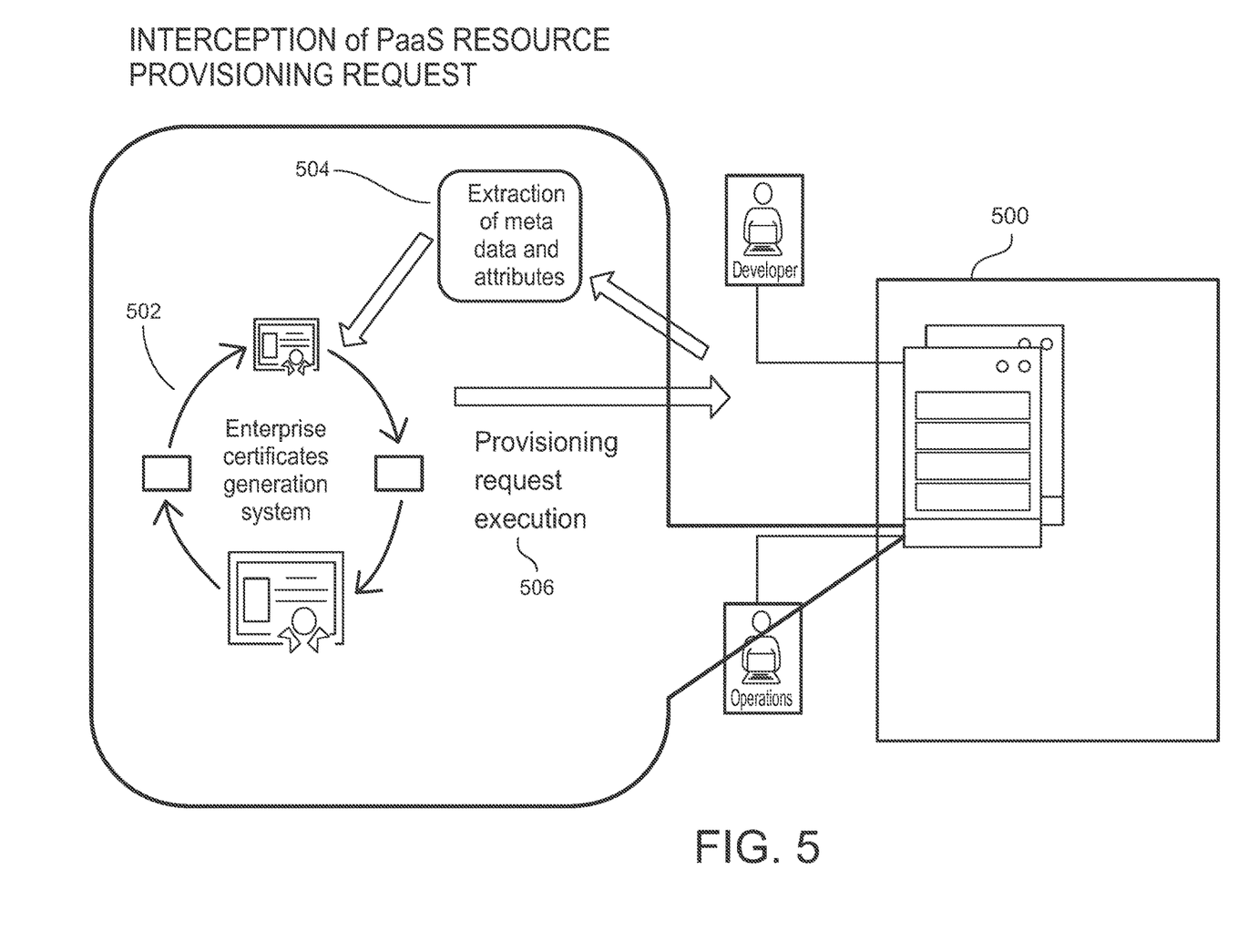
FIG. 5 is a schematic diagram that illustrates an example of a process of intercepting a cloud computing service platform resource-provisioning request for embodiments of the invention.

Embodiments of the invention may involve, for example, intercepting provisioning requests. FIG. 5 is a schematic diagram that illustrates an example of a process of intercepting a cloud computing service platform resource-provisioning request for embodiments of the invention. Assume, for example, a request in cloud computing service platform for a new container of an open-source document-oriented database. In order to do this, the platform 500 may need to allocate new components, such as a new virtual machine and a new container, which may need to interact with other components, such as a web server, in the system.

Therefore, in embodiments of the invention, it may be necessary to provision one or more certificates, for example, for the application for its interaction with external nodes, such as the web server, as well as its interactions with internal components of the cloud computing service platform system 500, such as platform nodes, platform access, and identification and authorization system and monitoring components of the cloud computing service platform system 500. While all of such external nodes and internal components of the cloud computing service platform system 500 must be aware of newly allocated resources and be able to communicate with them, a feature of embodiments is controlling such communication.

Thus, provisioning certificates for embodiments of the invention may be based on context, such as the goal of a particular node, the nodes with which it will communicate, and whether it is a DEV/UAT or a PROD environment. The system for embodiments of the invention may generate certificates that see these attributes in the context of the cloud computing service platform system 500. Referring to FIG. 5, provisioning requests may be intercepted and passed to an enterprise certificate generation system 502 which generates certificates that are based on the attributes of the cloud computing service platform system. Such certificates are not generic certificates that allow communication between all nodes but also include extracted attributes 504 from the cloud computing service platform system 500 itself. In an embodiment, the extracted attributes may then be inserted into certificate fields as specified by RFC5280 (e.g. subjectAltName extension, policy constraints extension and Internationalized Resource Identifiers).

Coupling an external certificate management system with cloud computing service platform flows and attributes for embodiments of the invention may involve, for example, the coupling of certificate generation and distribution with cloud computing service platform environment attributes, conditions, states and metadata. For example, referring again to FIG. 5, when a new provisioning request, such as a scale up request, is generated by the cloud computing service platform 500, a request to the enterprise certificate management system 502 may be generated. Such a provisioning request may be accompanied by all of the required cloud computing service platform specific attributes 504 describing the components and the nodes. Based on such attributes 504, the enterprise certificate system 502 may provision and distribute the certificates 506 to the provisioned nodes directly or via cloud computing service platform flows to complete the cloud computing service platform resource provisioning process.

Since the generated certificates include execution environment attributes, such as DEV/UAT/PROD, state, and node details, they cannot be used outside the specific cloud computing service platform context. Referring further to FIG. 5, the mechanism to intercept cloud computing service platform provisioning requests may involve, for example, extracting the metadata and attributes 504 which may then be passed to the enterprise certificates generation system 502 for certificate provisioning. Only certificates that are suitable to the specific cloud computing service platform context are generated and distributed, and the cloud computing service platform provisioning request may be finalized 506.

It is to be understood that a cloud computing service platform system is a large and complicated system with multiple types of entities which must authenticate to one another. Such interacting pairs of nodes may include, for example, compute nodes running code and code registry storing the code and images, cluster managers and controllers communicating with the compute nodes, API servers and nodes, and cloud computing service platform subcomponents and services. When such entities are automatically provisioned by the cloud computing service platform system, embodiments of the invention supply them with the correct certificates generated by the external certificate management system that is not part of the platform 500.

As noted, embodiments of the invention may involve, for example, intercepting cloud computing service platform provisioning requests and extracting the cloud computing service platform context 504 including attributes and metadata such as system state, as well as component attributes, such as execution environment (DEV/UAT), function and image attributes. Such embodiments may also involve, for example, generating the corresponding certificates 502 scoped to the specific cloud computing service platform context and activating the corresponding cloud computing service platform APIs to provision 506 the certificates to the relevant entities and continue the intercepted cloud computing service platform flow.

Controlling multi-cloud image registries for embodiments of the invention may involve, for example, an architecture with an enterprise registry controlling updates, signatures and certifications of images in multiple registries built in as part of multiple cloud computing service platform systems located, for example, on-premises or on external clouds. The enterprise registry may serve as the primary repository used to push updates, in one-to-many relationship, to multiple cloud computing service platform-based clouds with internal registries used by cloud computing service platform orchestrators. Security tools may be used to check the images deployed from internal registries, verifying the image content, attributes and signatures, checking that they match the expected attributes in the enterprise registry and comply with enterprise certification and security requirements.

Figure 6A:
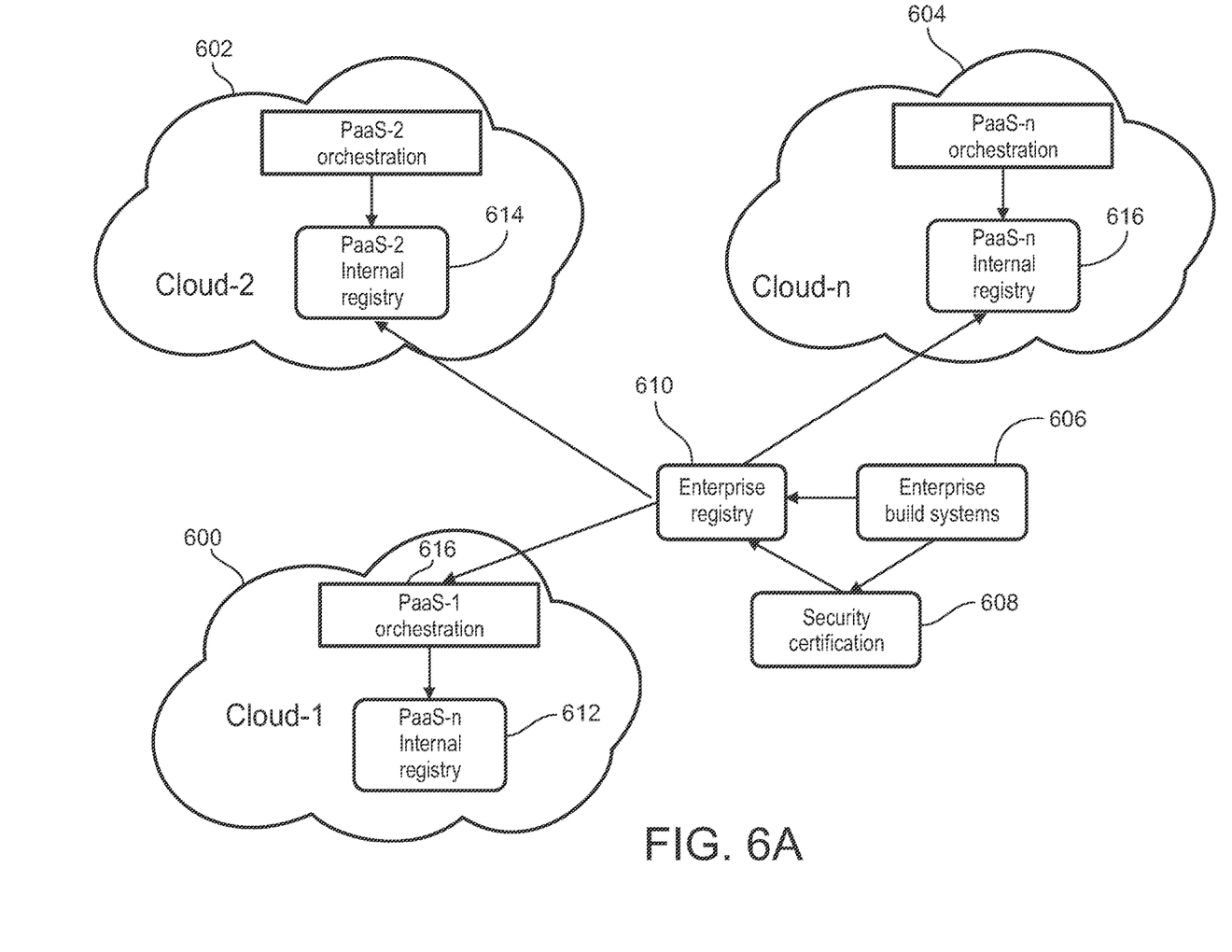
FIGS. 6A, 6B, and 6C are schematic diagrams that illustrate an example of components and flow of information between components for a multi-cloud image registries control aspect for embodiments of the invention.
Figure 6B:
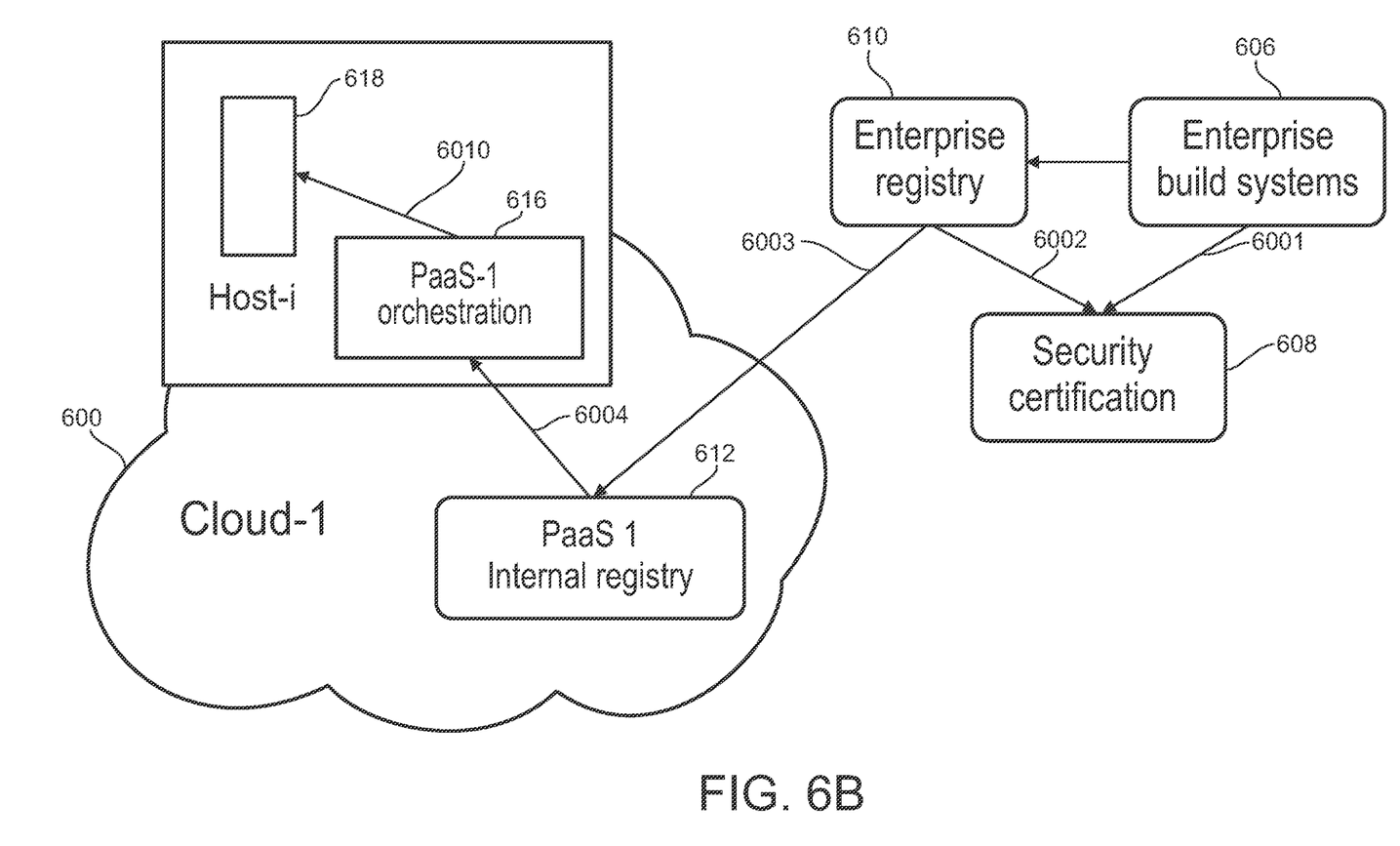
Figure 6C:
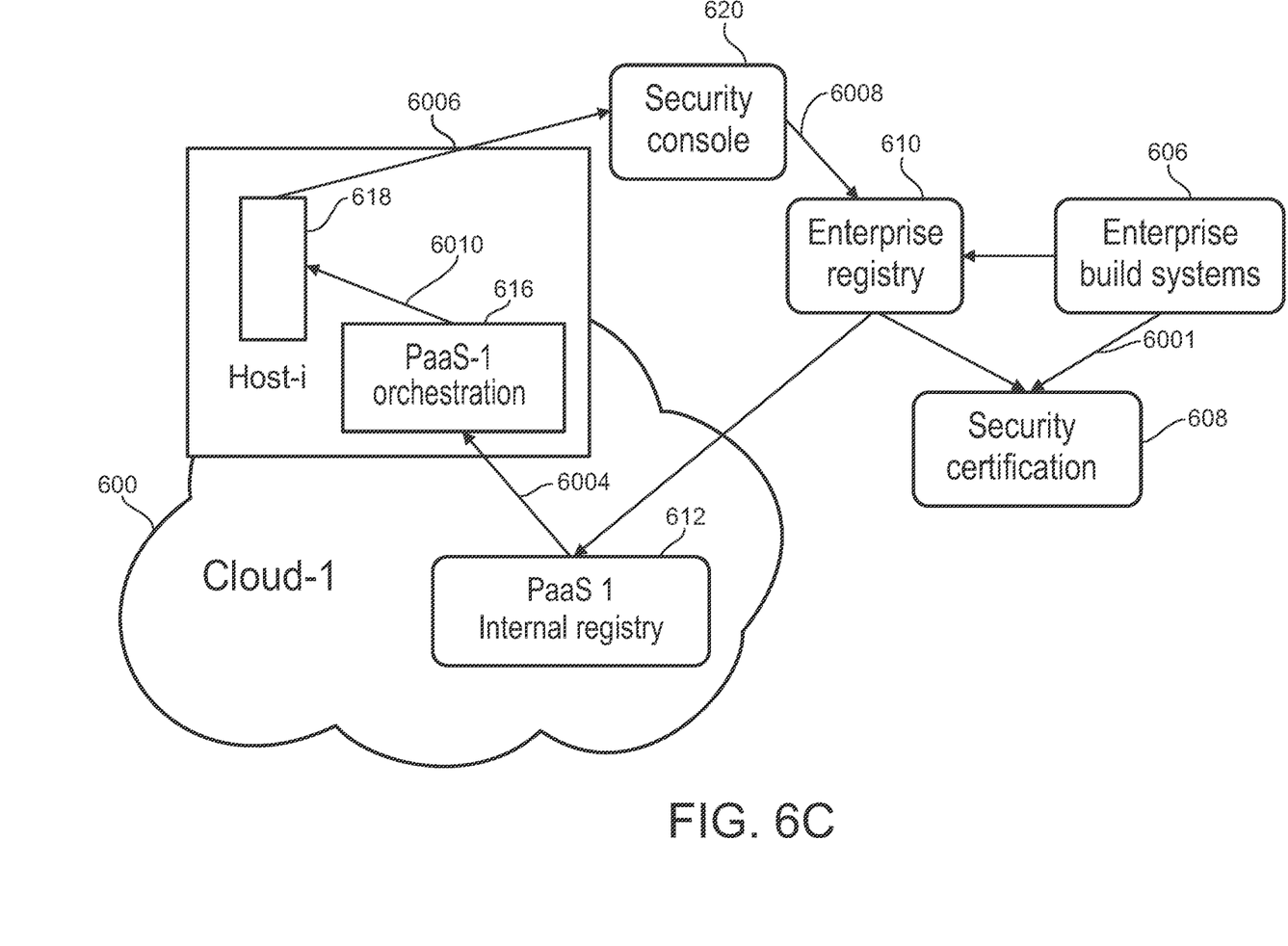

FIGS. 6A, 6B, and 6C are schematic diagrams that illustrate an example of components and flow of information between components for a multi-cloud image registries control aspect for embodiments of the invention. In such aspect, an enterprise registry that controls updates and violations in multiple registries may be built in as part of multiple cloud computing service platform systems located, for example, on-premises or on external clouds. Referring to FIG. 6A, embodiments of the invention may involve a system with multiple cloud computing service platform based clouds, such as Cloud-1 600, Cloud-2 602, and Cloud-n 604, in which a centralized enterprise build system 606, a security certification component 608, and an enterprise registry 610 are used to push updates to the internal registries 612, 614, and 616 of an n-cloud architecture comprising, for example, Cloud-1 600, Cloud-2 602, and Cloud-n 604, respectively.

Referring further to FIG. 6A, as noted, embodiments of the invention may include multiple cloud computing service platform based clouds, such as Cloud-1 600, Cloud-2 602, and Cloud-n 604, and enterprise components may include, for example, enterprise build systems 606 that may control building of applications and containers, an enterprise certification system 608 that may perform security verification, certification and signing of images, and an enterprise registry 610 that may be a primary location for storing certified enterprise images.

Referring to FIG. 6B, when a new image is built via the enterprise build system 606, at 6001, the new image may be passed to a security certification and signing system 608, which may inspect the image content to assure, for example, that the image includes only trusted, certified and non-vulnerable components. The security certification component 608 may then generate digital cryptographic signatures ensuring the image integrity, authenticity and certification authority. Once certified, at 6002, the image may be placed in the enterprise registry 610, which may be used to control the remaining registries in the n-cloud computing service platform-based clouds.

Referring further to FIG. 6B, as noted, at 6001, images may be distributed from the enterprise build systems 606 to the enterprise security certification systems 608 and then, at 6002, to the main enterprise image registry 610 controlling all of the images. Thereafter, at 6003, new images may be pushed to the platform internal registry 612 that may be part of the cloud computing service platform system and thereafter, at 6004, may be deployed to cloud computing service platform orchestration 616.

Referring to FIGS. 6A and 6B, once a new image is published in the enterprise registry 610, the image may be pushed to the n-registries of the n Clouds. The internal registries 612, 614, and 616 may serve, for example, as caches to improve performance or may trigger various events, such as system upgrades, scaling up or down or redeployment of images. For example, when a cloud computing service platform orchestrator 616 detects a new image, at 6004, the cloud computing service platform orchestrator may automatically pull the new image from the internal cloud computing service platform registry 612 and may gradually replace all of the relevant containers to be spawned from the new version.

Referring now to FIG. 6C, security tools may be deployed on a host 618 to continuously monitor the hosts and the deployed containers/images to verify the integrity/certification signatures generated by the security certification components 608. Referring further to FIG. 6C, such security tools may continuously monitor the deployed images and, at 6006, may report discrepancies and violations, such as deployment of images which do not satisfy the enterprise certification requirements, to a security console 620.

Referring further to FIG. 6C, security violations that are reported to the security dashboard 620, such as image signatures that do not match the required enterprise certifications, may trigger redeployment requests at 6008 to the enterprise registry 610. Once a redeployment event is received by the enterprise registry 610, the flow from the enterprise registry may continue as shown in FIG. 6B in which the image may be pushed, at 6003, to the platform internal registry 612 and thereafter pulled, at 6004, by the cloud computing service platform orchestration 616 and redeployed, at 6010, by the cloud computing service platform orchestration 616.

In embodiments of the invention, signatures may be verified, for example, by using asymmetric encryption mechanisms and/or by pulling supplementary keys and metadata by the security console 620 from the certification component 608. If any discrepancies or violations are detected, they may be reported to the security console 620, which may trigger a re-deployment flow as shown in FIG. 6C. Security violations may be, for example, vulnerable or non-compliant images that do not fulfill the security certification requirements of the certification component 608. Such mismatches may be detected by signature verifications or additional queries to the security certification component 608.

Figure 7:
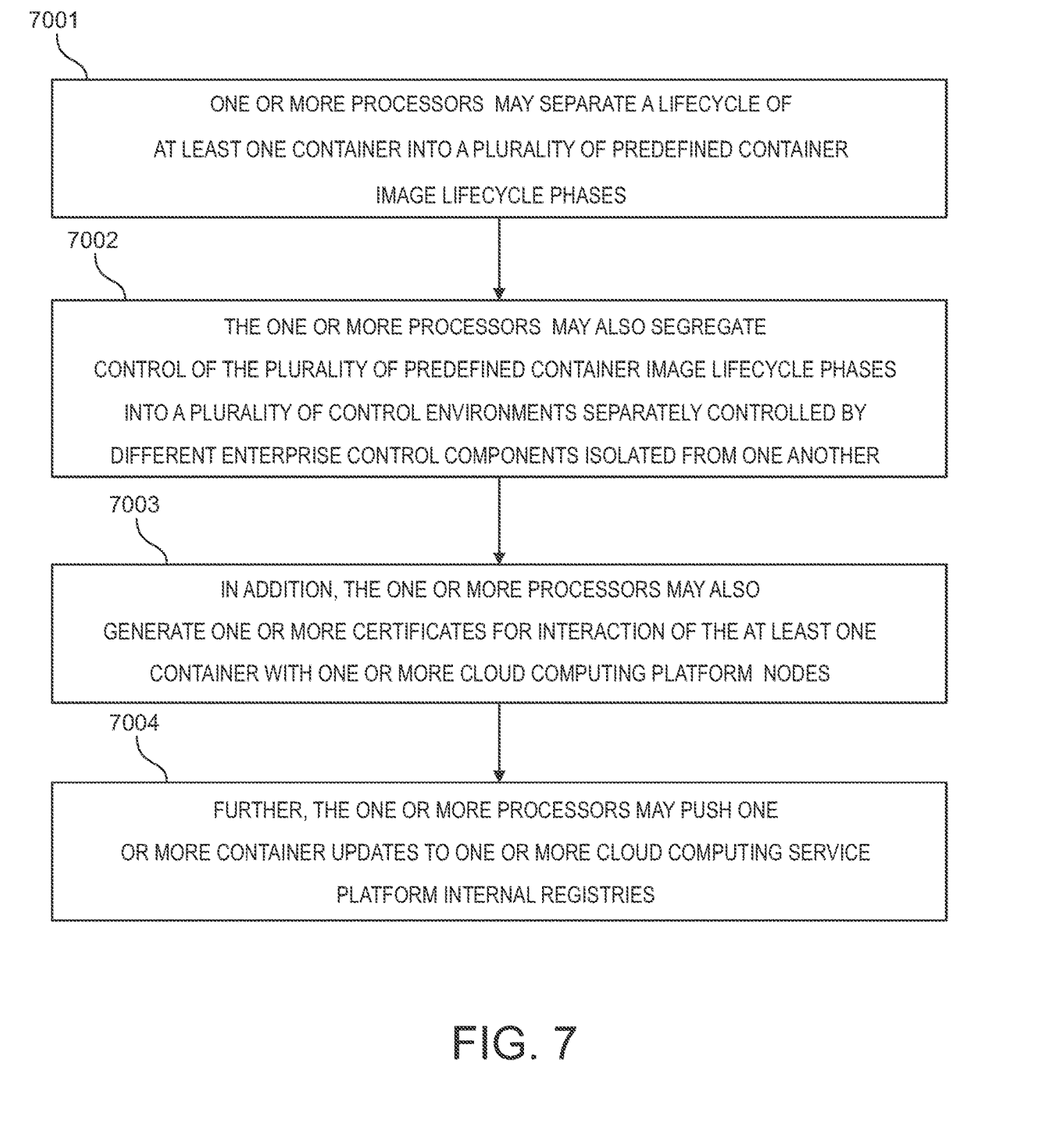
FIG. 7 is a flow chart that illustrates an example of a process of container orchestration security for embodiments of the invention.

FIG. 7 is a flow chart that illustrates an example of a process of container orchestration security for embodiments of the invention. Referring to FIG. 7, at 7001, one or more processors of an enterprise server may separate a lifecycle of at least one container into a plurality of predefined container image lifecycle phases. Referring again to FIG. 7, at 7002, the one or more processors of the enterprise server may also segregate control of the plurality of predefined container image lifecycle phases into a plurality of control environments separately controlled by different enterprise control components isolated from one another. In addition, at 7003 in FIG. 7, the one or more processors of the enterprise server may generate one or more certificates for interaction of the at least one container with one or more external nodes. Further, at 7004 in FIG. 7, the one or more processors of the enterprise server may push one or more container updates to one or more cloud computing service platform internal registries.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices Glossary Container image: A collections of union files system layers allowing packaging of the environment including the operating system, user-added files, and meta-data. Container images may be stored in container image registries and may then be pulled to a computer node and instantiated into containers (see below)

Container: A running environment instantiated from container images. Containers may be repackaged into images, which save all filesystem modifications performed while a container was running.

Container image registry: A centralized registry that allows storing of container images and controlling of their attributes, meta-data and access permissions.

Enterprise registry: A container image registry which is managed and controlled by the enterprise, outside of the cloud computing platform.

Platform internal registry: A container image registry which is provided as part of a cloud computing platform.

Container client: A user interface that allows communication between the user and a container management daemon.

Container management daemon: A software component which is executing on a container host and performing commands as requested by a container client. These commands may include operations such as "container build", which builds containers from their specification files; "container pull", which copies container images from a container image registry to a container host; and "container run", which starts the execution of a container.

What is claimed is:

1. A system, comprising:
one or more processors coupled to memory programmed to:
separate a lifecycle of at least one container into a plurality of predefined container image lifecycle phases;
segregate control of said plurality of predefined container image lifecycle phases into a plurality of control environments separately controlled by different enterprise control components comprising a container image build control component, a container image cloud orchestration control component, and a container image deployment control component isolated from one another; and
generate at least one certificate for interaction of said at least one container with at least one cloud computing platform node.

2. The system of claim 1, wherein the one or more processors are further programmed to separate the lifecycle of said at least one container into the plurality of predefined container image lifecycle phases comprising an image distribution phase, a deployment phase, a container execution control phase, and a monitoring and protection phase.

3. The system of claim 1, wherein the one or more processors are further programmed to segregate control of said plurality of predefined container image lifecycle phases into the plurality of control environments comprising an image development environment, an image testing environment, and a container production environment separately controlled by said different enterprise control components isolated from one another.

4. The system of claim 1, wherein the one or more processors are further programmed to control promotion of container images between the plurality of control environments comprising an image development environment, an image testing environment, and a container production environment.

5. The system of claim 1, wherein the one or more processors are further programmed to couple a cloud computing service platform policy engine function with a secondary approval function of an enterprise server.

6. The system of claim 5, wherein the one or more processors are further programmed to intercept and forward cloud computing service platform operations requests for authorization by the cloud computing service platform policy engine to the enterprise secondary approval function of the enterprise server.

7. The system of claim 5, wherein the one or more processors are further programmed to intercept and forward the cloud computing service platform operations requests for authorization according to predefined platform policies by the cloud computing service platform policy engine to the enterprise secondary approval function of the enterprise server.

8. The system of claim 7, wherein the policy engine comprises an authentication module and the enterprise secondary approval function comprises an enterprise multifactor authentication system.

9. The system of claim 7, wherein the one or more processors are further programmed to return the cloud computing service platform operations requests to the cloud computing service platform policy engine after secondary approval by the enterprise secondary approval function of the enterprise server.

10. The system of claim 9, wherein the one or more processors are further programmed to return the cloud computing service platform operations requests to the cloud computing service platform policy engine after secondary approval by the enterprise secondary approval function of the enterprise server according to predefined internal policies of the enterprise independent of the predefined platform policies.

11. The system of claim 1, wherein the one or more processors are further programmed to couple cloud computing service platform context attributes and metadata with an enterprise certificate generation function of the enterprise server.

12. The system of claim 1, wherein the one or more processors are further programmed to intercept and pass cloud computing service platform resource provisioning requests to the enterprise certificate generation function of the enterprise server.

13. The system of claim 12, wherein the one or more processors are further programmed to extract cloud computing service platform context attributes and metadata from the cloud computing service platform resource provisioning requests.

14. The system of claim 13, wherein the one or more processors are further programmed to pass the cloud computing service platform resource provisioning requests with the extracted cloud computing service platform context attributes and metadata to an enterprise certificate generation function of the enterprise server.

15. The system of claim 14, wherein the one or more processors are further programmed to generate the at least one certificate based at least in part on the extracted cloud computing service platform context attributes and metadata by the enterprise certificate generation function of the enterprise server.

16. The system of claim 1, wherein the one or more processors are further programmed to push at least one container update from the enterprise registry to at least one cloud computing service platform internal registry.

17. The system of claim 16, wherein the one or more processors are further programmed to push said at least one container update to a plurality of cloud computing service platform internal registries.

18. The system of claim 1, further comprising one or more security tools performing checks to confirm that images deployed from internal registries are consistent with images in an enterprise registry and comply with predefined enterprise certification and security requirements, said checks consisting at least in part of verification of predefined enterprise procedures, signatures, image content and attributes.

19. A method, comprising:
separating, by one or more processors coupled to memory, a lifecycle of at least one container into a plurality of predefined container image lifecycle phases;
segregating, by the one or more processors, control of said plurality of predefined container image lifecycle phases into a plurality of control environments separately controlled by different enterprise control components comprising a container image build control component, a container image cloud orchestration control component, and a container image deployment control component isolated from one another; and
generating, by the one or more processors, at least one certificate for interaction of said at least one container with at least one cloud computing platform node.

20. The method of claim 19, wherein separating the lifecycle of the at least one container into the plurality of predefined container image lifecycle phases further comprises separating the lifecycle of said at least one container into the plurality of predefined container image lifecycle phases comprising an image distribution phase, a deployment phase, a container execution control phase, and a monitoring and protection phase.

21. The method of claim 19, wherein segregating control of said plurality of predefined container image lifecycle phases into a plurality of control environments further comprises segregating control of said plurality of predefined container image lifecycle phases into a plurality of control environments consisting at least in part of an image development environment, an image testing environment, and a container production environment separately controlled by different enterprise control components isolated from one another.

22. The method of claim 19, further comprising coupling, by the one or more processors, a cloud computing service platform policy engine function with a secondary approval function of the enterprise server.

23. The method of claim 19, further comprising coupling, by the one or more processors, cloud computing service platform context attributes and metadata with an enterprise certificate generation function of the enterprise server.

24. The method of claim 19, further comprising pushing, by the one or more processors, container image updates from an enterprise repository to one or more cloud computing service platform internal registries.

25. The method of claim 24, further comprising employing the one or more cloud computing service platform internal registries as an image content delivery network distributing enterprise updates and container images to remote locations.

26. The method of claim 19, further comprising removing vulnerable, outdated, non-compliant or unused images from the plurality of internal computing registries container images based on feedback from internal or external security monitoring systems, and triggering enterprise image re-build and re-deploy procedures.

27. The method of claim 19, further comprising employing one or more tools for continuous integration, continuous deployment and release automation to control image updates, attributes, lifecycle and transition between registries.

* * * * *